US006868272B1

(12) United States Patent
Berkowitz et al.

(10) Patent No.: US 6,868,272 B1
(45) Date of Patent: Mar. 15, 2005

(54) METHOD AND APPARATUS FOR ROAMING IN HIERARCHICAL MOBILE COMMUNICATIONS NETWORK

(75) Inventors: Paul Berkowitz, Little Silver, NJ (US); Chauncey Shey, East Brunswick, NJ (US); Jan Vancraeynest, White Plains, NY (US); Jose Vasconcellos, Lincroft, NJ (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/328,306

(22) Filed: Jun. 8, 1999

(51) Int. Cl.[7] .............................................. H04Q 7/20
(52) U.S. Cl. .................. 455/445; 455/433; 379/201.02
(58) Field of Search ............... 455/432.1, 433, 455/445, 552.1, 406, 432.2, 432, 552; 379/201.02, 211, 211.01; 709/106; 725/106

(56) References Cited

U.S. PATENT DOCUMENTS

| | | | |
|---|---|---|---|
| 4,670,905 A | 6/1987 | Sandvos et al. ............... 455/33 |
| 4,833,701 A | 5/1989 | Comroe et al. ................ 379/60 |
| 5,345,498 A | 9/1994 | Mauger ........................ 379/58 |
| 5,353,340 A | 10/1994 | Kunz ............................ 379/60 |
| 5,434,854 A | * 7/1995 | Focarile et al. .............. 370/335 |
| 5,497,412 A | 3/1996 | Lannen et al. ................. 379/60 |
| 5,526,400 A | 6/1996 | Nguyen ........................ 379/59 |
| 5,629,974 A | 5/1997 | Rajala et al. ................. 379/58 |
| 5,659,544 A | 8/1997 | La Porta et al. ............. 370/312 |
| 5,666,107 A | 9/1997 | Lockhart et al. ............. 340/827 |
| 5,724,658 A | 3/1998 | Hasan ........................ 455/445 |
| 5,832,382 A | 11/1998 | Alperovich .................. 455/433 |
| 5,862,481 A | * 1/1999 | Kulkarni et al. .......... 455/432.2 |
| 5,978,678 A | * 11/1999 | Houde et al. ................ 455/433 |
| 6,104,915 A | * 8/2000 | Zhang et al. .................. 455/76 |
| 6,385,454 B1 | * 5/2002 | Bahl et al. ................... 455/450 |

FOREIGN PATENT DOCUMENTS

| | | | |
|---|---|---|---|
| WO | WO 96/35309 | 11/1996 | ............ H04Q/7/38 |
| WO | WO 97/04611 | 2/1997 | ............ H04Q/7/24 |
| WO | WO 98/23123 | 5/1998 | ............ H04Q/7/38 |
| WO | WO 98/56198 | 12/1998 | ............ H04Q/7/24 |
| WO | WO 00/28772 | 5/2000 | ............ H04Q/7/38 |

OTHER PUBLICATIONS

US 5,282,240, 1/1994, Buhl et al. (withdrawn)
Newton's Telecom Dictionary, 15th Edition, Feb. 1999, pp. 272, 762, 763.*

* cited by examiner

Primary Examiner—Nay Maung
Assistant Examiner—Edan Orgad
(74) Attorney, Agent, or Firm—George A. Willman; Felix L. Fischer

(57) ABSTRACT

Communications system comprising a set of interface devices adapted to be coupled to a public switch telephone network (PSTN) and radio transceivers. The interface devices are configured to serve in various geographic regions. The radio transceivers are coupled to the interface devices in the set of interface devices. The radio transceivers are for communication with mobile subscribers. The mobile subscribers each have a home region. The circuitry coupled to the set of interfaces routes a call through a path including an interface device that serves the mobile subscriber's home region, for a call involving the PSTN and a mobile subscriber located outside the mobile subscriber's home region.

27 Claims, 9 Drawing Sheets

METHOD AND APPARATUS FOR ROAMING IN HIERARCHICAL MOBILE COMMUNICATIONS NETWORK

BACKGROUND OF THE INVENTION

1. Field of the Invention

This invention relates to the field of communication networks. In particular, the invention relates to a method and apparatus for roaming in a mobile communications network.

2. Description of the Related Art

A mobile communications system may include various systems between which a subscriber may wish to travel. Often a subscriber is associated with a particular system and when the subscriber is present in a region serviced by another system, the subscriber is considered to be roaming. A subscriber's home system is typically a system for which the subscriber is registered. Several techniques allow mobile subscribers to roam into systems different from the subscriber's home system. An example is the IS-41 based system.

Some prior art systems use home location and visited location registers (HLR/VLR) and even dedicated switching networks for mobile subscribers. A disadvantage of some prior systems is the possibility of single point of failure, the need for a dedicated signaling network, the need for central coordination between entities entering into roaming agreements and difficulties in billing.

Some methods in the prior art rely on explicit rules for determining the home location of a roaming subscriber and how to handle a call to and from such a subscriber. Typically in such applications these functions are carried out by interrogation of an HLR. Such an approach introduces complexity and delay. Prior art methods also may require additional signaling traffic to establish correct billing for each call since the path may go through a different exchange than the subscriber's home exchange. Such additional signaling may be complex.

SUMMARY OF THE INVENTION

One aspect of the invention is directed to a method of modifying an existing telephone network. Interface devices serve various geographic regions of the telephone network. The interface devices are coupled to the telephone network. The interface devices are coupled to circuitry coupled to radio transceivers that service mobile subscribers that may be located in one of the geographic regions. The mobile subscribers are each assigned to a respective geographic region. When a subscriber is located in a region other than the geographic region to which the subscriber is assigned, circuitry coupled to the interface devices routes a call with a mobile subscriber through a path including a radio transceiver that serves the region in which the mobile subscriber is currently located and an interface device that serves the region to which the subscriber is assigned.

One embodiment of the present invention is directed to a communications system that includes a first network dispersed throughout a national area. The communications system also includes a second network coupled to the first network by interfaces in a plurality of geographic regions in the national area. The second network includes radio transceivers for communicating with subscribers located in the plurality of geographic regions. Each subscriber has a home region, and various subscribers are located outside of their home regions. The system includes circuitry that routes all communication between a subscriber and the first network through an interface between the first network and the second network in the subscriber's home region.

Another embodiment of the present invention is directed to a communications system that includes a set of interfaces adapted to be coupled to a public switched telephone network (PSTN). The interfaces ar configured to serve various geographic regions. For communication between the PSTN and a subscriber located in a region other than a region in which an interface to which the subscriber is assigned is located, circuitry included by the system and coupled to the set of interfaces causes the communication to take place via the interface to which the subscriber is assigned. According to one embodiment of the invention, the circuitry coupled to the set of interfaces is coupled to the interfaces via an E1 interface. According to one embodiment of the invention communication between a circuitry coupled to the set of interfaces and the subscriber takes place entirely over a land line system.

Yet another embodiment to the invention is directed to a communications system comprising radio transceivers and a set of interface devices adapted to be coupled to a PSTN. The interface devices are configured to serve various geographic regions. The radio transceivers are coupled to the interface devices in the set of interface devices. The radio transceivers are for communication with mobile subscribers. The mobile subscribers each have a home region. The circuitry coupled to the set of interfaces routes a call through a path including an interface device that serves the mobile subscriber's home region, for a call involving the PSTN and a mobile subscriber located outside the mobile subscriber's home region.

Another aspect of the invention is directed to a method of modifying an existing telephone network in which interface devices are located in various geographic regions of the telephone network. The interface devices are coupled to the telephone network in the various geographic regions. The interface devices are coupled to circuitry coupled to radio transceivers that service mobile subscribers that may be located in one of the geographic regions. The mobile subscribers are each assigned to a respective geographic region. When a subscriber is located in a region other than the geographic region to which the subscriber is assigned, circuitry coupled to the interface devices routes a call with a mobile subscriber through a path including a radio transceiver in the region in which the mobile subscriber is currently located and an interface device in the region to which the subscriber is assigned.

In yet another embodiment of the invention, each subscriber is associated with one or more directory numbers. Routing of incoming calls is conditioned upon a subscriber profile when the subscriber is out of the subscriber's home geographic region. Incoming calls may be routed to the subscriber in the subscriber's new location or to another subscriber or to voice mail depending on the subscriber's feature profile and which directory number with which the call is associated. If a subscriber has for example directory numbers 1, 2, 3 assigned, the subscriber may set up the subscriber profile to cause the interface device to act as follows when the subscriber is out of the area:

for incoming calls associated with number 1, route to the subscriber's new location ("follow-me" number);

for incoming calls associated with number 2, route another directory number; or for incoming calls associated with number 3, route to voice mail.

DETAILED DESCRIPTION

One embodiment of the invention is directed to a system for routing calls when subscribers are located outside of the coverage area of an interface to the public network in their home area. When such a subscriber wants to make a call, the circuitry routes the call to an interface to the public network that serves the home area. Similarly, incoming calls from the public network are routed through the interface that services the home region, to equipment in the region outside of the home region where the subscriber is currently located. Such an arrangement has an advantage of, according to one embodiment, making roaming transparent to the public network and billing systems.

Figure 1:
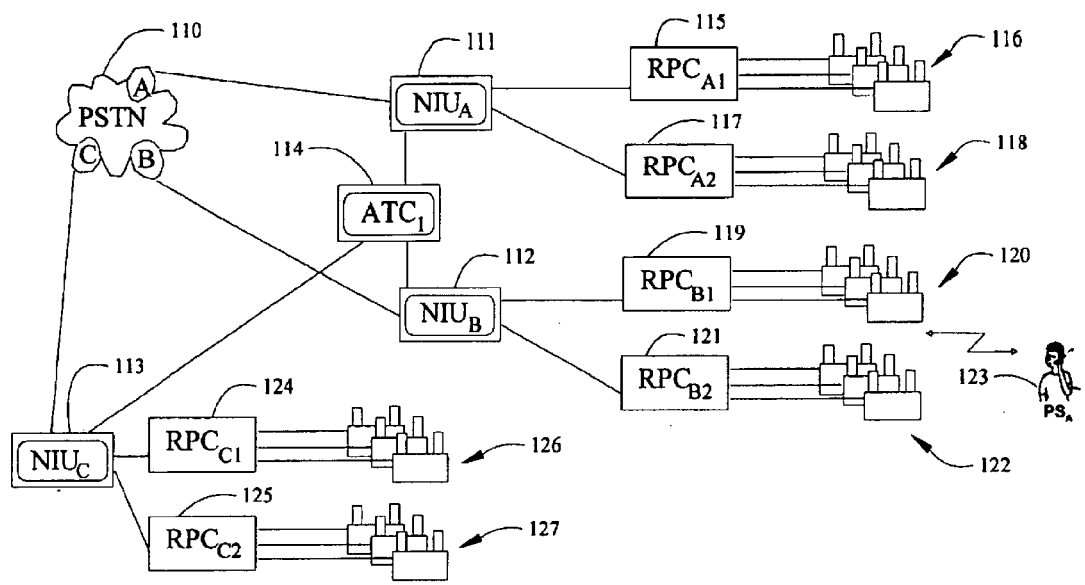
FIG. 1 is a block diagram of a telephone communications system, according to an embodiment of the invention.

FIG. 1 is a block diagram of a telephone communications system, according to an embodiment of the invention. The system includes interface devices that are coupled to the public network ($NIU_A$ 111, $NIU_{B1}$ 112, and $NIU_C$ 113). Radio port controllers are coupled to the various interfaces—as shown, $NIU_A$ 111 is coupled to $RPC_{A1}$ 115 and $RPC_{A2}$ 117, $NIU_B$ 112 is coupled to $RPC_{B1}$ 119 and $RPC_{B2}$ 121, and $NIU_C$ 113 is coupled to $RPC_{C1}$ 124 and $RPC_{C2}$ 125. The radio port controllers are coupled to radio transmitters —$RPC_{A1}$ 115 is coupled to radio transceivers 116, $RPC_{A2}$ 117 to radio transceivers 118, $RPC_{B1}$ 119 is coupled to radio transceivers 120, $RPC_{B2}$ 121 is coupled to radio transceivers 122, $RPC_{C1}$ 124 is coupled to radio transceivers 126, and $RPC_{C2}$ 125 is coupled to radio transceivers 127. Radio transceivers are used to communicate with mobile subscribers, for example, $PS_A$ 123. Radio transceivers include radio ports and appropriate transceiver circuitry.

The interfaces each serve a different geographic region by being coupled, through the radio port controllers, to radio transmitters that serve the respective geographic region. According to one embodiment of the invention, such interfaces are located in the respective regions that they serve. According to another embodiment of the invention, such interfaces are not necessarily located in the respective regions that they serve. For example, the interfaces may be co-located.

Circuitry $ATC_1$ 114 couples the various interface devices ($NIU_A$ 111, $NIU_B$ 112, and $NIU_C$ 113. Circuitry $ATC_1$ 114 may be implemented in the form of dedicated circuits, or a computerized system. Typically, circuitry $ATC_1$ 114 includes bearer channels and control channels. E1 links are provided to interconnect the various interface devices via $ATC_1$ 114. Circuitry that routes calls between interface devices, circuitry ATC as shown in FIG. 1, may be implemented as a computer system. The ATC circuitry acts as a controller and includes an E1 interface. The circuitry ATC includes bearer and control circuitry. The bearer circuitry provides a path for transmission of information, such as voice from a subscriber, to the correct interface. Such transmission typically occurs over an E1 interface. The circuitry that routes between the interfaces (e.g., ATC) includes a cross connect, which is a split that maps between various incoming and outgoing lines. An ATC may have, in one example, 30 multiplexed lines.

An interface device, shown in FIG. 1 as, for example, $NIU_A$ 111, may be implemented as a computer with controllers. The interface device includes interface boards for interfacing with radio port controllers (e.g., $RPC_{A1}$ 115). Such interfacing takes place typically via an E1 standard. The interface from the interface device to the PSTN (PSTN 110) may take place via an analog. T1 interface, or other interface. The interface device is typically coupled to a class 5 switch in the PSTN. The system may include circuitry coupled to the set of interfaces that converts a signal from the subscriber to packets before passing the signal to the PSTN.

According to one embodiment of the invention, an interface device can have a large number of subscribers assigned to it, e.g., 10,000 subscribers, and a large number of roaming subscribers. According to one embodiment of the invention, subscribers are registered in a particular home interface device for billing purposes and because of telephone number assignment to the particular PSTN ports to which the home interface device is connected. The sizing of connectivity between interface devices and circuitry ATCs is determined by the amount of roaming traffic between respective interface devices and the desired grade of service for such roaming traffic. According to one embodiment of the invention, for calls with the subscriber located in a region other than the geographic region to which the subscriber is assigned, billing information is passed to the existing network regarding location of the subscriber only through the interface that serves the region to which is assigned.

When a subscriber, for example, $PS_A$ 123 is located out of the subscriber's home area, the following may occur, according to an embodiment of the invention. Radio ports under a network interface emit a paging area identifier unique for each network interface. This paging area identifier is received by subscribers in the network interface's coverage area. As a subscriber moves away from the region served by the subscriber's home network interface device, say, $NIU_A$ 111, it notices that the paging area identifier changes. The subscriber then knows that it has moved into the coverage area of a new network interface device. At this point, the subscriber, say $PS_A$ 123, sends a registration message including its own identification to the new network interface device, say $NIU_B$ 112. $NIU_B$ 122 receives the registration request and notices from the subscriber identification that $PS_A$ 123 is not assigned in an $NIU_B$'s 112 database.

$NIU_B$ 112 forwards a registration request to circuitry $ATC_1$ 114. $ATC_1$ 114 either knows about the subscriber $PS_A$ 123 (through previous registration or calls made by a subscriber $PS_A$ 123) or does not know about subscriber $PS_A$ 123. If $ATC_1$ 114 knows about subscriber $PS_A$ 123, then circuitry $ATC_1$ 114 updates the location entry in its database for subscriber $PS_A$ 123 to indicate that the subscriber $PS_A$ 123 is located in the area covered by interface device $NIU_B$ 112 and sends the registration request on to interface device $NIU_A$ 111. If circuitry $ATC_1$ 114 does not know about subscriber $PS_A$ 123, then circuitry $ATC_1$ 114 sends the registration request on to NIUs connected to $ATC_1$ 114 except to the interface device that originated the request. In this case, for example, the registration request is sent to interface device $NIU_A$ 111 and interface device $NIU_C$ 113 but not to interface device $NIU_B$ 112. The one interface device recognizes the subscriber $PS_A$ 123 from the subscriber identification contained in the registration message. Such interface device recognizes subscriber $PS_A$ 123 as assigned to that interface device's database and responds to the registration request. The circuitry $ATC_1$ 114 then updates its table to reflect that subscriber $PS_A$ 123 belongs to interface device $NIU_A$ 111 and is currently assigned to $NIU_B$ 112.

In another embodiment of the invention, subscriber $PS_A$ 123 is programmed with the identity of its assigned or home region, or is programmed with the identity of the assigned or home network interface device. According to one embodiment of the invention, such assignment is made at the time the subscriber is activated for service and has the ability to inform the network about the subscriber's home region and/or corresponding interface device. Upon receipt of such notification, an interface device serving each visited region can directly forward the registration to the proper home interface device through the circuitry ATC.

In another embodiment of the invention, each interface device and circuitry ATC can deduce from the construction of the subscriber identification to which region the subscriber belongs. The registration is then forwarded to the proper home interface device corresponding to the region through the circuitry ATC. An example of such subscriber identification structuring is the use of prefixes unique to each interface device.

When a call comes in for subscriber $PS_A$ 123 from the public network (terminating call), interface device $NIU_A$ 111 sends a page request to radio port controllers under $NIU_A$ 111 and also to circuitry $ATC_1$ 114. Because subscriber $PS_A$ 123 is outside of the coverage of network interface $NIU_A$ 111, none of the radio port controllers under interface device $NIU_A$ 111 respond with a positive page acknowledgement. If circuitry $ATC_1$ 114 knows about subscriber $PS_A$ 123, it forwards the page to NIU under whose coverage it knows subscriber $PS_A$ 123 to have most recently been in (for example, to interface device $NIU_B$ 112). If circuitry $ATC_1$ 114 does not know about subscriber $PS_A$ 123, circuitry $ATC_1$ 114 sends the page to all interface devices coupled to circuitry $ATC_1$ 114, except to the originating interface device (in this case, to interface device $NIU_B$ 112 and interface device $NIU_C$ 113, but not to interface device $NIU_A$ 111). The interface device that has subscriber $PS_A$ 123 under its coverage responds to the page. Circuitry $ATC_1$ 114 forwards the page response to the home interface device and establishes a call path between a home interface device, through circuitry $ATC_1$ 114, through a visited interface device and to subscriber $PS_A$ 123. Authentication and alerting are also performed. An advantage of such a configuration is that a call may be delivered to subscriber $PS_A$ 123 without the home interface device, interface device $NIU_A$ 111, explicitly knowing the location of subscriber $PS_A$ 123.

In another embodiment to of the invention, the home interface device keeps track of the location of each subscriber assigned to it by communication from circuitry ATC and therefore can directly page the correct radio port controller for a terminating call without having the circuitry ATC broadcast the page to all interface devices connected to it. Because the home interface device updates its database as the location is updated in the circuitry ATC, an advantage is gained that the interface device does not need to query the circuitry ATC.

Having the home interface device keep track of the location of each subscriber assigned to it also allows the home interface to make different routing decisions when the subscriber is out of the subscriber's home coverage area, according to one embodiment of the invention. When a single subscriber is associated with multiple directory numbers, such an approach may provide an advantage. Incoming calls associated with each of the directory numbers may be routed differently depending on instructions in the subscriber's service profile. For instance, calls associated with (directed to) the subscriber's first directory number may be routed to the subscriber's new location ("follow-me" service), calls associated with a subscriber's second directory number may be sent to voice mail, and calls associated with a subscriber's third directory number may be routed to another subscriber.

When subscriber $PS_A$ 123 wants to originate a call from the coverage area of a visited region covered by interface device $NIU_B$ 112, subscriber $PS_A$ 123 sends a set-up message to interface device $NIU_B$ 112. Then $NIU_B$ 112 recognizes that subscriber $PS_A$ 123 is not assigned in the database of interface device $NIU_B$ 112. Call handling proceeds as in the case of registration and the call path is established between subscriber $PS_A$ 123 through the interface device $NIU_B$ 112 in the visited region, through circuitry $ATC_1$ 114 and home interface device $NIU_A$ 111. An advantage of such a configuration is that the call from subscriber $PS_A$ 123 is delivered to the network without the interface device which makes contact with subscriber $PS_A$ 123 necessarily knowing which interface device is the home interface device for subscriber $PS_A$ 123.

According to one embodiment of the invention, the same messages are exchanged between the interface device and the circuitry ATC for traveling subscribers as are exchanged between the interface device and radio port controllers for a home subscriber.

In another embodiment of the invention, subscriber $PS_A$ 123 is programmed with the identity of its home region or corresponding home interface device at the time the subscriber is activated for a service. The subscriber has the ability to inform the network about its home region or interface device. Upon receipt of such notification with a call set-up message, each visited region's interface device can directly forward the call to the proper home interface device through the circuitry ATC.

In another embodiment to the invention, each interface device and circuitry ATC can deduce from the construction of a subscriber identifier which region or interface device the subscriber belongs to and directly forward the registration to the proper home interface device through the circuitry ATC. An example of such subscriber ID structuring is the use of prefixes unique to each interface device or region.

When a subscriber moves from the coverage of a radio port belonging to a first interface device to the coverage of another radio port belonging to an interface device different from the first interface device, the subscriber initiates a handover by dropping the connection to the old radio port and requesting a new connection to the new radio port. The circuitry ATC processes the set-up messages similarly to a regular originating call, with the exception that authentication steps are skipped to reduce the time to set the new handover call and with the exception that the circuitry ATC retains any parts of the existing call that are common to the handover call.

Since calls enter or leave the mobile communications network through the home interface device of a subscriber even when the subscriber is located outside of the subscriber's home region, according to one embodiment of the invention, no change is needed in the billing methods of the public switched telephone network (PSTN) to which the mobile communications network connects. If an operator optionally wishes to bill differently for roaming calls, this flexibility is provided through separate call detail records which record call information such as which radio port and interface devices are involved in each call.

Figure 2:
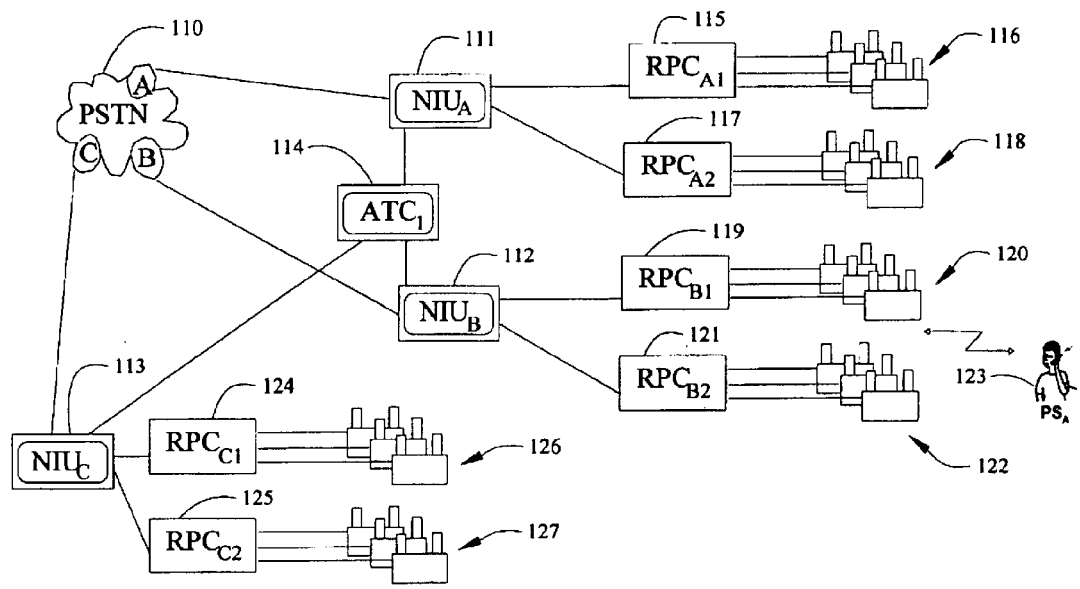
FIG. 2 is a block diagram illustrating circuitry acting as a proxy for radio ports belonging to other interface devices for terminating calls, according to an embodiment of the invention.

FIG. 2 is a block diagram illustrating circuitry acting as a proxy for radio ports belonging to other interface devices for terminating calls, according to an embodiment of the invention. Thus, this shows that circuitry ATC may act logically like another radio port controller coupled to an interface device. For example, here interface device $NIU_A$ 211 is coupled to radio port controller $RPC_{A1}$ 212 and radio port controller $RPC_{A2}$ 214. Circuitry ATC 216 routes calls to respective interface devices (not shown) thus logically allowing access through interface device $NIU_A$ 211 to radio port controllers $RPC_{C1}$ 221, $RPC_{C2}$ 223, $RPC_{B1}$ 217, and $RPC_{B2}$ 219. Thus, subscriber $PS_A$ 230, whose home interface device is interface device $NIU_A$ 211, is provided access to PSTN 210 via remote radio ports serving a region outside of subscriber's $PS_A$ 230 home region. Thus, logically, the ATC 216 circuitry makes radio ports 222, 224, 218, and 220, which serve a remote region, appear like local radio ports coupled to home interface device $NIU_A$ 211.

Figure 3:
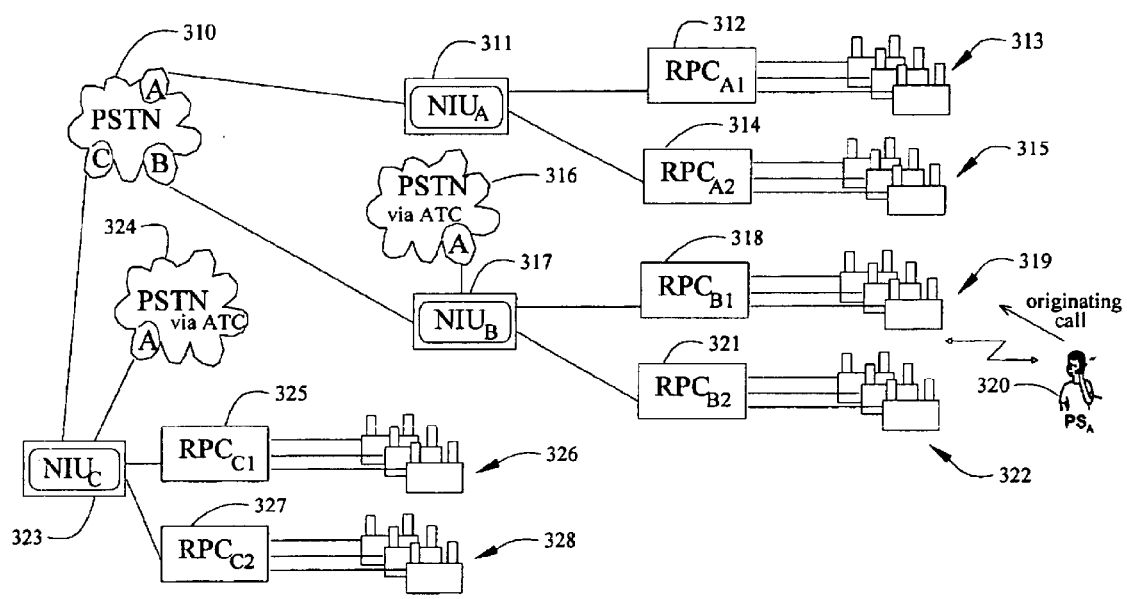
FIG. 3 is a block diagram illustrating circuitry acting as a proxy for network ports for a first interface for calls originating from mobile subscribers assigned to another region, according to an embodiment of the invention.

FIG. 3 is a block diagram illustrating circuitry acting as a proxy for network ports for a first interface for calls originating from mobile subscribers assigned to another region, according to an embodiment of the invention. An originating call is placed from subscriber $PS_A$ 320, currently located in the region of network interface $NIU_B$ 317. This call is received by a radio port among radio ports 319, which are coupled to radio port controller $RPC_{B1}$ 318. Radio port controller $RPC_{B1}$ 318 is coupled to interface device $NIU_B$ 317, which is coupled to PSTN 310. However, the call is routed through an ATC to interface device $NIU_A$ 311 through which the call is then routed to the PSTN 310. Thus, a virtual connection exists from interface device $NIU_B$ 317 into a portion of the PSTN to which interface device $NIU_A$ 311 is coupled. This is shown in the figure as the connection between interface device $NIU_B$ 317 and PSTN 316. Similarly, connection is provided virtually from interface device $NIU_C$ 323 to PSTN 310. This connection takes place physically through a connection between interface device $NIU_C$ 323 and interface device $NIU_A$ 311. However logically, it is as if there is a connection between interface device $NIU_C$ 323 at the portion of the PSTN to which interface device $NIU_A$ 311 is connected. This is shown here as a connection between interface device $NIU_C$ 323 and PSTN 324.

Figure 4:
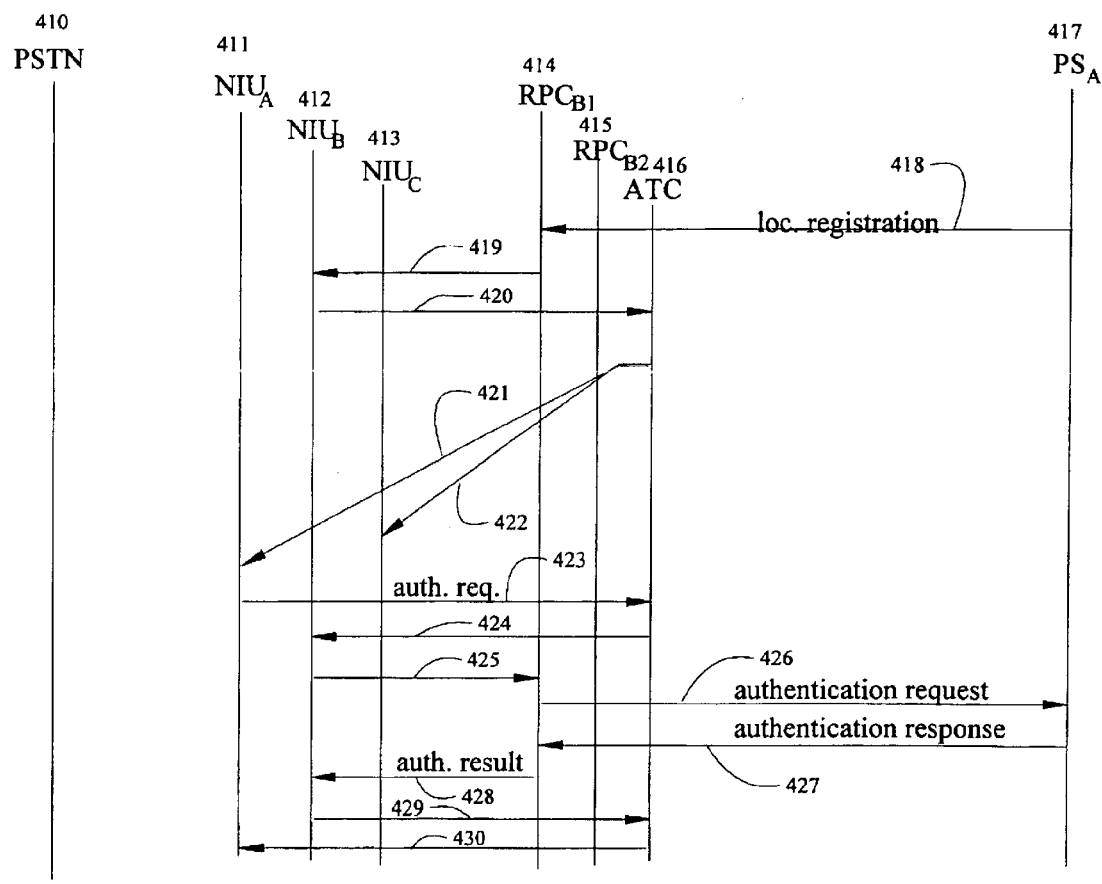
FIG. 4 is a flow diagram of location registration, according to an embodiment of the invention.

FIG. 4 is a flow diagram of the location registration process, according to an embodiment of the invention. FIG. 4 has various lines representing communication with the following entities: PSTN 410, $NIU_A$ 411, $NIU_B$ 412, $NIU_C$ 413, $RPC_{B1}$ 414, $RPC_{B2}$ 415, ATC 416, and $PS_A$ 417. First a registration message is received by a radio port and forwarded to the radio port controller. As shown here, location registration 418 is sent from subscriber $PS_A$ 417 to radio port $RPC_{B1}$ 414. In this case, subscriber $PS_A$ 417 is located in the coverage area of radio port controller $RPC_{B1}$ 414, which is not the home location of subscriber $PS_A$ 417. Radio port controller $RPC_{B1}$ 414 sends a message to its respective interface device, interface device $NIU_B$ 412 (line 419). Interface device $NIU_B$ 412 does not recognize subscriber $PS_A$ 417. Thus interface $NIU_B$ 412 sends a message to the circuitry ATC 416 (line 420). Assuming that ATC 416 has not yet stored $PS_A$ 417 in its database, then ATC 416 queries other interface devices to determine the home location for subscriber $PS_A$ 417 (lines 421 and 422, which are sent to interface device 411 $NIU_A$ and interface device $NIU_C$ 413, but not interface device $NIU_B$ 412).

In this example, subscriber $PS_A$ 417 belongs to interface device $NIU_A$ 411. Thus, interface device $NIU_A$ 411 responds (authorization request 423). ATC 416 forwards this response to interface device $NIU_B$ 412. Interface device $NIU_B$ 412 then sends the authorization request 428 to interface device $NIU_B$ 412. An authorization response is sent back (429) from interface device $NIU_B$ 412 to circuitry ATC 416. The authorization response is then sent from circuitry ATC 416 back to interface device $NIU_A$ 411. Interface device $NIU_A$ 411 determines whether the subscriber $PS_A$ 417 should be authenticated, and can then make future determinations based on this authentication.

Figure 5:
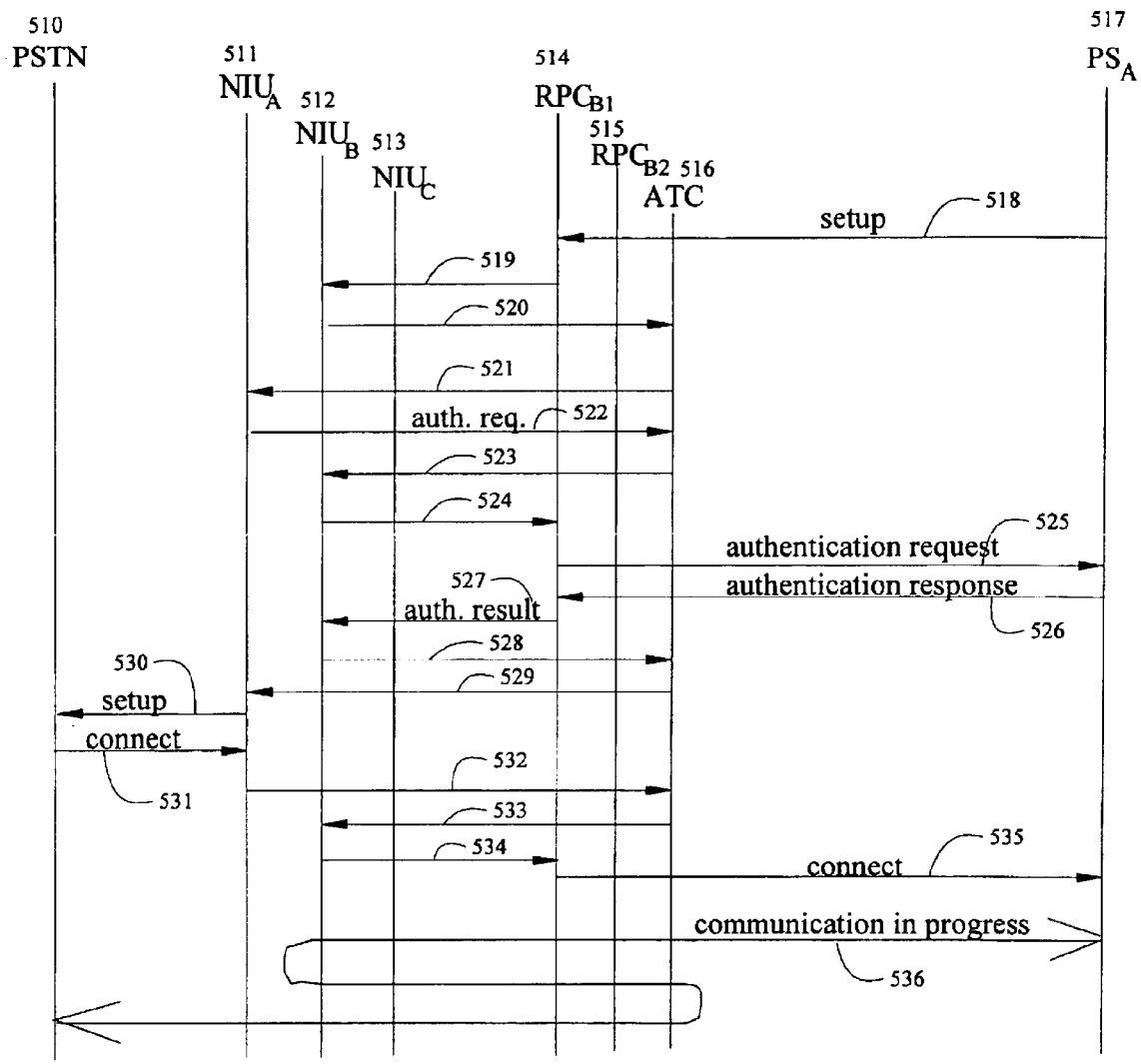
FIG. 5 is a flow diagram of an originating call process, according to an embodiment of the invention.

FIG. 5 is a block diagram of an originating call process, according to an embodiment of the invention. Here it is assumed that subscriber $PS_A$ 517 is already registered at the particular location and that the circuitry ATC knows that subscriber $PS_A$ 517 belongs to interface device $NIU_A$ 511. Subscriber $PS_A$ 517 is located in the coverage area of interface device $NIU_B$ 512. Thus, subscriber $PS_A$ 517 sends a set-up request 518 to radio port controller $RPC_{B1}$ 514. This request is forwarded to interface device $NIU_B$ 512 (line 519). Interface device $NIU_B$ 512 signals circuitry ATC's 516 (line 520). Because circuitry ATC 516 knows that subscriber $PS_A$ 517 belongs to interface device $NIU_A$ 511, circuitry ATC 516 signals interface device $NIU_A$ 511. Interface device $NIU_A$ 511 makes an authorization request (line 522) to circuitry ATC 516. In response, circuitry ATC 516 forwards the request to interface device $NIU_B$ 512 (line 523), and interface device $NIU_B$ 512 forwards the request to radio port controller $RPC_{B1}$ 514, which forwards the message to subscriber $PS_A$ 517 (line 525). An authentication response is returned from subscriber 517 to radio port controller $RPC_{B1}$ 514 (line 525), and this result is forwarded to interface device $NIU_B$ 512 (line 527), and to circuitry ATC 516 (line 528) and back to interface device $NIU_A$ 511 (line 529). If the authentication result is good, then $NIU_A$ 511 makes a set-up request to the PSTN 510 (line 530). A connect response is received from PSTN 510 to interface device $NIU_A$ 511 (connect line 531). The PSTN makes necessary set-up in order to connect the message back.

The connect message is then forwarded to circuitry ATC 516 from interface device $NIU_A$ 511 (line 532). This response is forwarded from circuitry ATC 516 to interface device $NIU_B$ 512 (line 533) and subsequently to radio port controller $RPC_{B1}$ 514 and on to subscriber $PS_A$ 517 (lines 534 and 535). A communications connection is then set up between subscriber $PS_A$ 517 and PSTN 510. The communications path includes subscriber $PS_A$ 517, radio port controller $RPC_{B1}$ 514, interface device $NIU_B$ 512, circuitry ACT 516, interface device $NIU_A$ 511, and PSTN 510. In this way, a call path is established between a subscriber ($PS_A$ 517) and the public-switched telephone network (PSTN 510) by way of the subscriber's home interface device ($NIU_A$ 511).

Figure 6:
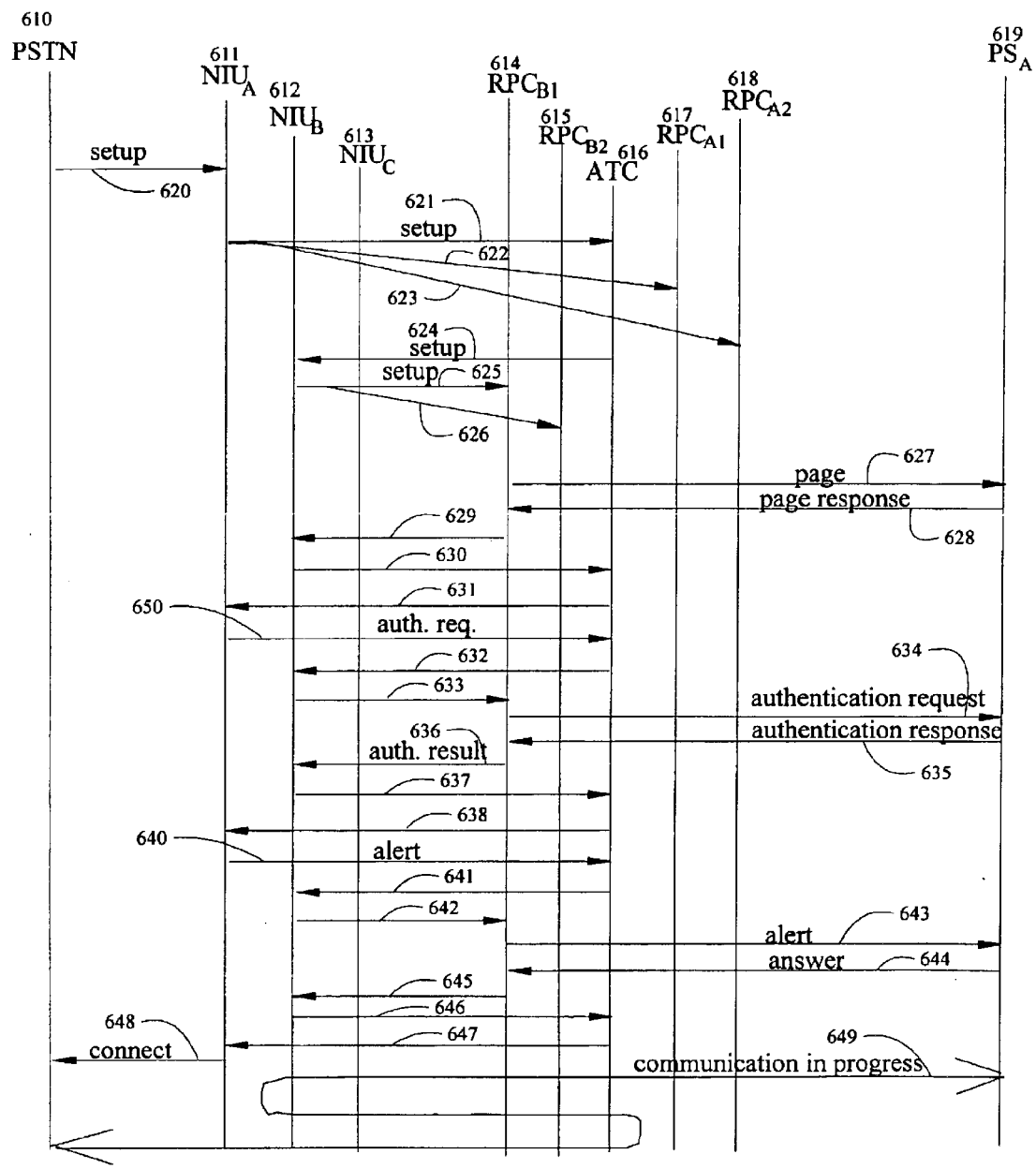
FIG. 6 is a flow diagram of a terminating call process, according to an embodiment of the invention.

FIG. 6 is a flow diagram of a terminating call process, according to an embodiment of the invention. Shown here is communication between entities: public switched to telephone network PSTN 610, interface device $NIU_A$ 611, interface device $NIU_B$ 612, interface device $NIU_C$ 613, radio port controller $RPC_{B1}$ 614, radio port controller $RPC_{B2}$ 615, circuitry ATC 616, radio port controller $RPC_{A1}$ 617, radio port controller $RPC_{A2}$ 618, and subscriber $PS_A$ 619. When a call originates from PSTN 610, its set-up request is sent from PSTN 610 to interface device $NIU_A$ 611 (set-up 620). This set-up request is made to interface device $NIU_A$ 611 because that interface device is the home interface device for subscriber $PS_A$ 619. Interface device $NIU_A$ 611 sends a set-up request to the radio port controllers coupled to interface device $NIU_A$ 611 (radio port controller $RPC_A$, radio port controller $RPC_{A1}$ 617, and radio port controller $RPC_{A2}$ 618, via set-up request 622 and 623). A set-up request is also sent to ATC 616 (set-up 621). This set-up 621 is sent to ATC 616 because ATC 616 looks to interface device $NIU_A$ 611 like another radio port controller.

Circuitry ATC 616 sends a set-up request to interface device $NIU_B$ 612 (line 624). Interface device $NIU_B$ 612 sends the set-up request to radio port controllers located in the areas of interface device $NIU_B$ 612 (radio port controller $RPC_{B1}$ 614 and radio port controller $RPC_{B2}$ 615, lines 625 and 626). A page is then made by radio port controller $RPC_{B1}$ 614 (page 627 from radio port controller $RPC_{B1}$ 614 to subscriber $PS_A$ 619). Subscriber $PS_A$ 619 responds to radio port controller $RPC_{B1}$ 614 (page response 628).

The response is forwarded to the local interface device (line 629 to interface device $NIU_B$ 612) and on the circuitry ATC 616 (line 630). Response is forwarded to the home interface device (line 631 from ATC 616 to interface device $NIU_A$ 611). Interface device $NIU_A$ 611 responds with an authorization authentication request 650 to circuitry ATC 616. Circuitry ATC 616 forwards the authentication request to interface device $NIU_B$ 612 (line 632), which forwards the request (line 633) to radio port controller $RPC_{B1}$ 614. Radio port controller $RPC_{B1}$ 614 forwards the request to subscriber $PS_A$ 616 (authentication request 634). Subscriber $PS_A$ 619 provides an authentication response 635 to radio port controller $RPC_{B1}$ 614, which forwards the result (636 to interface device $NIU_B$ 612). The result is additionally forwarded to circuitry ATC 616, and along to interface device $NIU_A$ 611. The interface device $NIU_A$ 611 responds with an alert 640 to circuitry ATC 616. The alert is forwarded to the interface located near the subscriber, interface $NIU_B$ 612 (line 641) and is additionally forwarded to radio port controller $RPC_{B1}$ 614 (ine 642), and further to subscriber $PS_A$ 619 (alert 643). The alert causes the subscribers device to ring, for example. The subscriber answers (line 644). This answer is forwarded from radio port controller $RPC_{B1}$ 614 and on to the local interface device $NIU_B$ 612 (line 645), and on to circuitry ATC 616 (box 646), and on to the home interface device $NIU_A$ 611 (line 647). A connect message is returned to the public switched network PSTN 610 (connect 648).

The call is then established between the PSTN 610 and subscriber $PS_A$ 619 via the subscriber's home interface device $NIU_A$ 611. The path includes PSTN 610, interface device $NIU_A$ 611, circuitry ATC 616, interface device $NIU_B$ 612, radio port controller $RPC_{B1}$ 614 and subscriber $PS_A$ 619 (communication in progress line 649).

Figure 7:
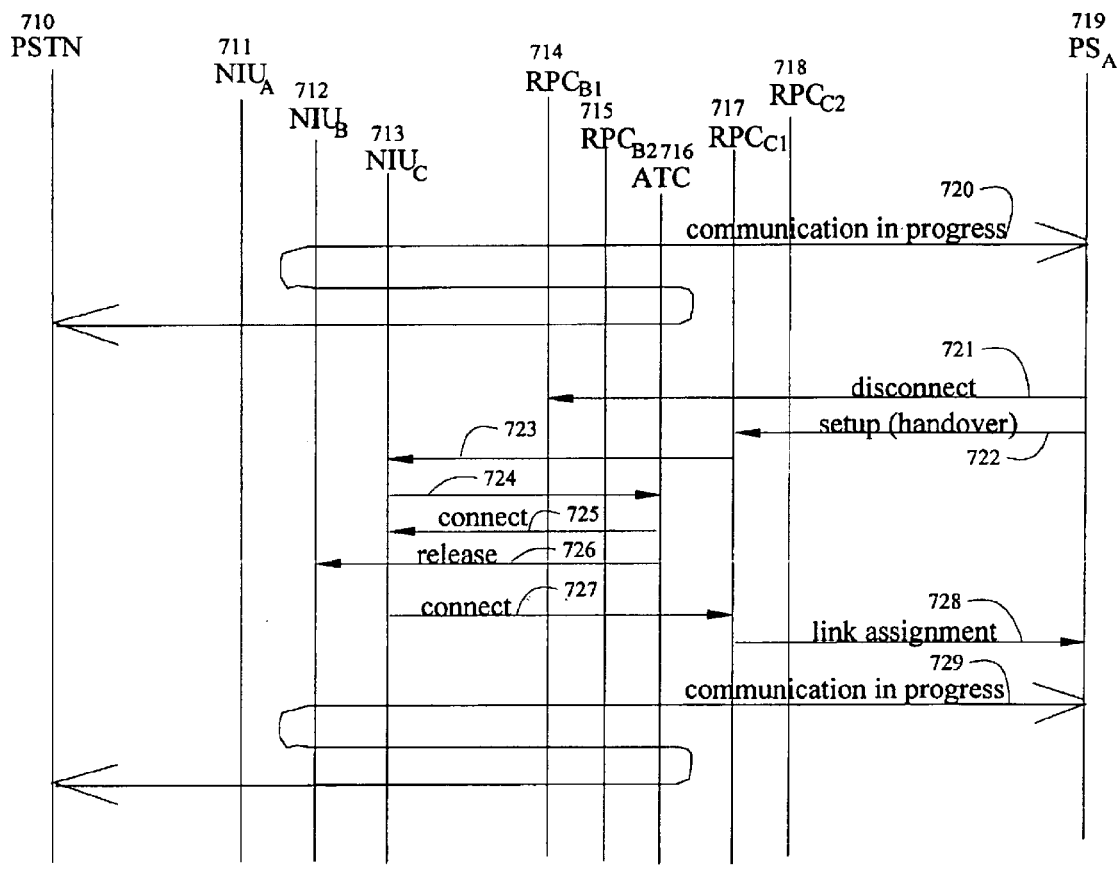
FIG. 7 is a flow diagram of an interface handover process, according to an embodiment of the invention.

FIG. 7 is a flow diagram of an interface handover process, according to an embodiment of the invention. First a connection is established between subscriber $PS_A$ 719 and PSTN 710 via subscriber's home interface device $NIU_A$ 711 and the interface device that serves the region in which the subscriber is currently located, $NIU_B$ 712. Later the subscriber $PS_A$ 719 moves from the coverage area of interface device $NIU_B$ 712 and into the coverage area of interface device $NIU_C$ 713. A disconnect signal is sent from subscriber $PS_A$ 719 to radio port controller $RPC_{B1}$ 714, which is covered by interface device $NIU_B$ 712 (disconnect line 721). A set-up signal is sent from subscriber $PS_A$ 719 to radio port controller $NIU_{C1}$ 717, which serves the region in which the subscriber is now located (set-up line (hand-over) 722). Radio port controller $NIU_{C1}$ 717 forwards this set-up request to the local interface device $NIU_C$ 713 (line 723). This request is then forwarded to circuitry ATC 716 (line 724). A connect request is sent to the now local interface device $NIU_C$ 713 (line 725) from circuitry ATC 716. Now a release can be sent from circuitry ATC 716 to the old local interface device $NIU_B$ 712. A connect request is then sent from the new interface device $NIU_C$ 713 (connect 727) to the local radio port controller $RPC_{C1}$ 717 (connect 727). Authentication, according to one embodiment of the invention is not performed at this point.

Figure 8:
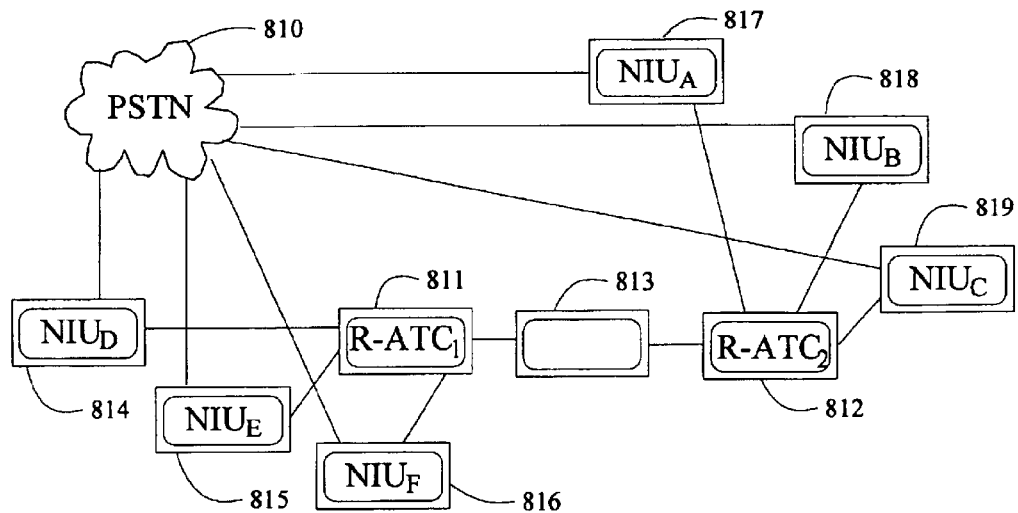
FIG. 8 is a block diagram illustrating the circuitry that routes calls configured as regional circuitry interconnected centrally, according to an embodiment of the invention.

FIG. 8 is a block diagram illustrating the circuitry that routes calls configured as regional circuitry interconnected centrally, according to an embodiment of the invention. Regional ATC $R-ATC_1$ 811 is coupled to interface devices that are located geographically closer to circuitry $R-ATC_1$ 811 ($NIU_D$ 714, $NIU_E$ 715, and $NIU_F$ 716). Another regional circuitry $R-ATC_2$ 812 located in another geographic area is coupled to interface devices geographically close to it ($NIU_A$ 817, $NIU_B$ 818, and $NIU_C$ 819). The circuitry is coupled via a connecting device 813, which couples $R-ATC_C$ 811 and $R-ATC_1$ 812. The various interface devices are coupled to the PSTN 810. The regional circuits ($R-ATC_1$ 811 and $R-ATC_2$ 812 are located geographically close to the interface devices that they service. Alternatively, the circuits are coupled to interface devices that are likely to have traffic between them.

Figure 9:
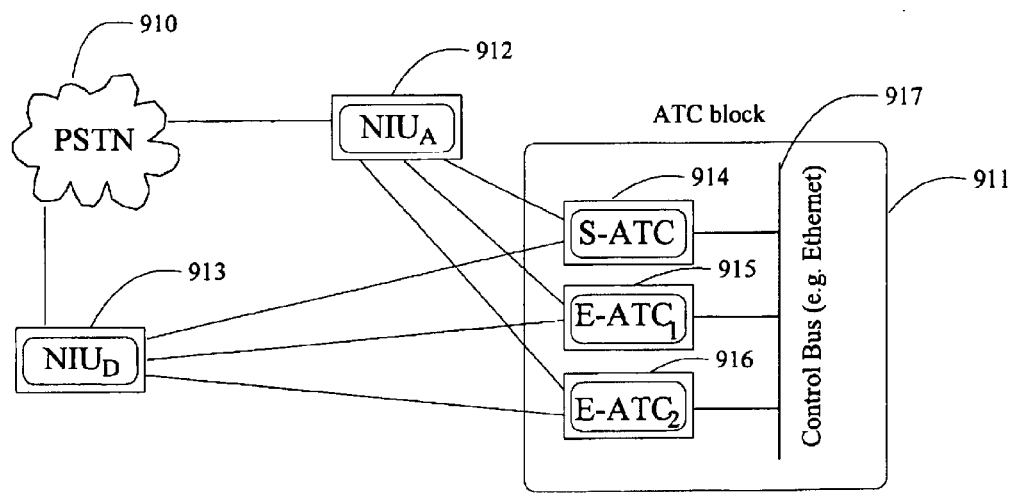
FIG. 9 is a block diagram illustrating expanded circuitry for routing calls connected by a local or distributed control bus, according to an embodiment of the invention.

FIG. 9 is a block diagram illustrating expanded circuitry for routing calls connected by a local or distributed control bus, according to an embodiment of the invention. The particular circuitry that is used to interconnect interface devices may have physical limits in terms of numbers of interconnections it can support, or other limitations. Therefore multiple such circuits may be combined as shown. Here, ATC block 911 is used to couple interface device $NIU_A$ 912 and interface device $NIU_D$ 913 and other interface devices between them, which are couple to the PSTN 910. The circuitry ATC block 911 is comprised of S-ATC 914, which is responsible for signaling and expansion circuits $E-ATC_1$ 915 and $E-ATC_2$ 916. The bearer capability of the ATC block 911 is expanded by connecting multiple expansion ATCs (E-ATC) between interface devices. The expansion ATCs are under control of the signaling ATC (S-ATC) over a common bus 917. Individual interface devices connect to one or more expansion ATCs and the signaling ATC. The signaling ATC coordinates time slot arrangements between each interface device and one or more of the expansion ATCs.

Figure 10:
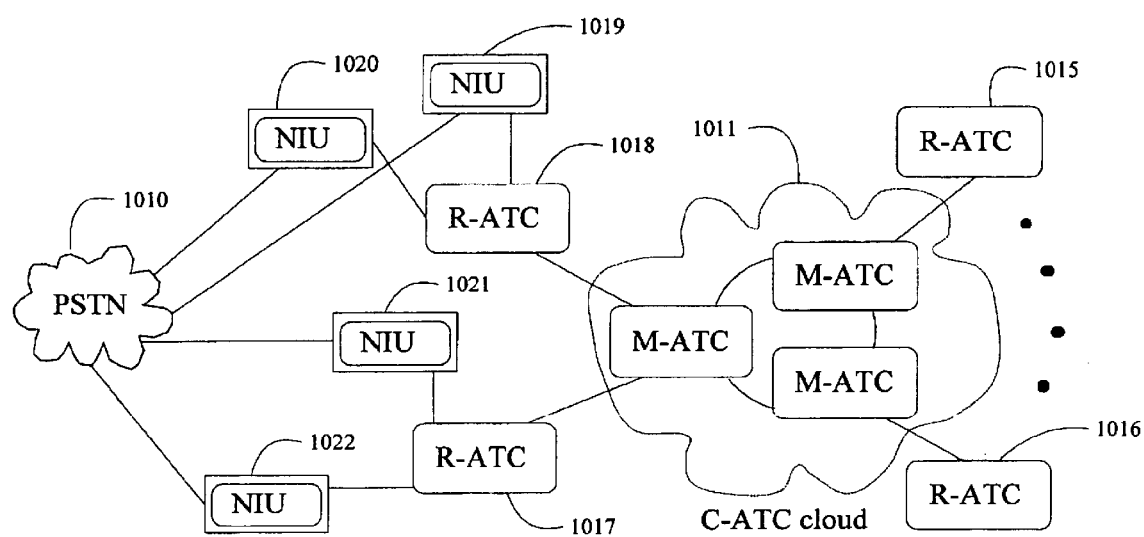
FIG. 10 is a block diagram illustrating circuitry that routes calls implemented in a mesh configuration, according to an embodiment of the invention.
Figure 11:
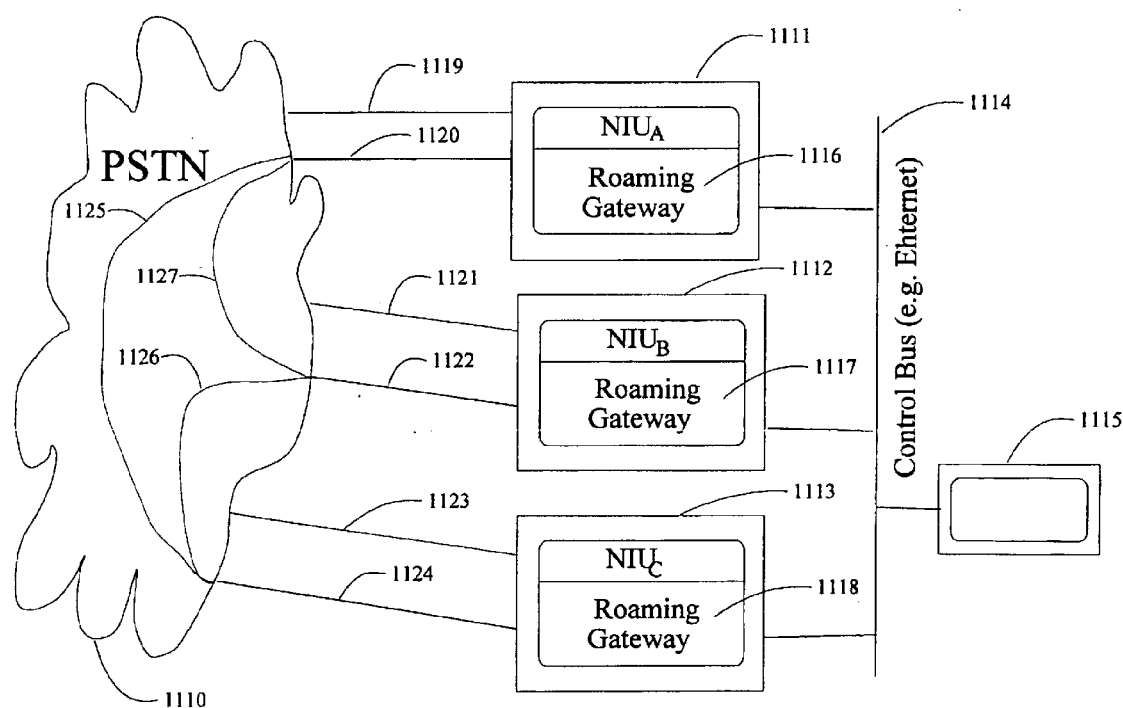
FIG. 11 is a block diagram showing circuitry that routes calls configured to route calls to home interfaces through the public switched telephone network (PSTN) by including a gateway functionality inside interface devices, according to an embodiment of the invention.

FIG. 10 is a block diagram illustrating circuitry that routes calls implemented in a mesh configuration, according to an embodiment of the invention. Mesh of circuits 1011, which routes calls between interfaces, comprises M-ATC 1012, M-ATC 1013, and M-ATC 1014. Such circuits 1012, 1013, and 1014 are interconnected in a mesh fashion whereby one circuit is coupled to more than one other circuit. Here, for example, circuit M-ATC 1012 is coupled to both circuit M-ATC 1013 and circuit M-ATC 1014. Circuit M-ATC 1014 is also coupled to circuit M-ATC 1013. An advantage of such a configuration is that a failure of a single circuit ATC may merely reduce the grade of service but does not necessarily destroy connectivity among the interface devices. Circuits 1011 may be advantageously partitioned based on roaming statistics between interface devices with adjacent coverage areas. For example, subscribers may typically roam between interface device NIU 1020, interface device NIU 1019, interface device NIU 1021, and interface device NIU 1022. For this reason, the regional circuits R-ATC 1018 and R-ATC 1017 may be coupled to the same circuit in the mesh, circuit M-ATC 1012. The association between interface devices and regional circuits may be determined based on typical roaming patterns. For example, subscribers may typically roam between interface devices NIU 1020 and NIU 1019. For this reason, for example, such interface devices may be coupled to a single regional circuit R-ATC 1018.

Under one embodiment of the invention, calls with a subscriber located outside of the subscriber's home region may be routed via the PSTN to the interface device that serves in the subscriber's home region. Then, the call is routed from the interface device that serves the subscriber's home region back into the PSTN. The routing from the equipment serving visited region to the home region's interface device takes place via connections in the PSTN 1110 without specifically billing the subscriber for such connections. Here interface devices $NIU_A$ 1111, $NIU_B$ 1112, and $NIU_C$ 1113 are coupled by a control bus 114, which is coupled to a circuit 1115. Calls with subscribers located in their home regions are routed between respective interface devices serving the home region and the PSTN 1110. Calls with a subscriber located outside of the subscriber's home region are routed through an interface device serving the region outside of the home region into the PSTN 1110 to the interface device serving the subscriber's home region, and then back into the PSTN 1110.

The routing of calls with roaming subscribers through the PSTN to the home interface takes place through a different type of routing than routing of a typical call directly to a subscriber. In one example, the routing takes place by way of a set of routing numbers reserved for routing roaming calls or other calls other than typical calls directly with subscribers. The routing numbers may be assigned in advance or may be dynamically allocated and released out of a pool of roaming numbers. Such allocation out of a pool of numbers may be made based on desired grade of service for the roaming calls. For a related discussion, see U.S. Pat. No. 5,353,340 by Kunz, which is incorporated herein by reference.

Circuitry 1115 (which may be referred to as a network ATC) may coordinate the assignment, release, and dissemination of such PSTN routing numbers among the interface devices. Circuitry 1115 may determine the home region or home interface device of a subscriber located outside of the subscriber's home region. Signaling information for such processes may be transferred over a control bus 1114, into the interface devices and circuitry 1115.

For an example of operation of such an approach, consider a case in which a subscriber is located outside of the subscriber's home region. For example, a subscriber has a home region associated with interface device $NIU_A$ 111, and the subscriber is currently located in an area covered by interface device $NIU_C$ 1113. Interface device $NIU_C$ 1113 recognizes that the subscriber is a roaming subscriber. By way of an interface, shown here as roaming gateway 1118, the bearer channel for the subscriber includes a path with connection 1124 from visited interface $NIU_C$ 1113 into the PSTN 1110 via connection 1125 and to the home interface device $NIU_A$ 1111 via connection 1120. The path also includes the connection 1119 from the home interface 1111 into PSTN 1110. The path through the PSTN 1125 takes place via a special assigned number, rather than a number associated with the particular subscriber. In this way, a roaming subscriber's call is routed from the visited interface device through the PSTN to the home interface device and back into the PSTN.

Roaming gateway 1116 of interface device $NIU_A$ 1111 is coupled to the PSTN by connection 1120, which represents a special connection for the purpose of routing roaming calls through the PSTN to the home interface device. Similarly, roaming gateway 1117 of interface device $NIU_B$ 1112 is coupled via line 1122 to PSTN 1110, and roaming gateway 1118, which is located in interface device $NIU_B$ 113 is coupled to PSTN 1110 via connection 1124. Connections 1125, 1126, and 1127 connect the respective roaming gateways for routing roaming calls back to their respective home interfaces through which they are routed back into the PSTN 1110.

Communication with a mobile subscribing has been described. However, according to one embodiment of the invention, communication between a circuitry coupled to the set of interfaces and the subscriber takes place entirely over a land line system.

Another embodiment of the invention is directed to a communications system and set of interfaces adapted to be coupled to a cable network. The cable network may comprise, in one example, a cable television network. The cable television network may comprise a coax network, a fiber network, or a hybrid fiber and coax network. Circuitry coupled to the interfaces routes transmissions of information to selected interfaces from among the set of interfaces adapted to be coupled to the network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of modifying an existing telephone network, the method comprising
    coupling interface devices to the telephone network, the interface devices coupled to circuitry coupled to radio transceivers that service mobile subscribers that may be located in ones of various geographic regions, the mobile subscribers each being assigned to a respective geographic region:
    coupling the interface devices to circuitry that, when a subscriber is located in a region other than a geographic region to which the subscriber is assigned, routes a call with the mobile subscriber through a path including a radio transceiver that serves the region in which the mobile subscriber is currently located and an interface device that serves the region to which the subscriber is assigned: and,
    wherein the subscriber has a set of directory numbers and each call is associated with at least one directory number, and for a call to the mobile subscriber, the interface devices, upon detecting that the mobile subscriber is located outside the mobile subscriber's home region, route the call depending on instructions in a subscriber service profile, the instructions being associated with the directory number that is associated with the call; and, wherein, for calls with the subscriber located in a region other than the geographic region to which the subscriber is assigned, billing information is passed to the existing network regarding location of the subscriber only through the interface that serves the region to which the subscriber is assigned.

2. A communications system comprising:

a set of interface devices adapted to be coupled to a PSTN, the interface devices configured to serve various geographic regions;

radio transceivers coupled to interface devices in the set of interface devices, the radio transceivers for communication with mobile subscribers, the mobile subscribers each having a home region; and circuitry coupled to the set of interface devices that, for a call involving the PSTN and a mobile subscriber located outside the mobile subscriber's home region, routes the call through a path including an interface device that serves the mobile subscriber's home region;

wherein the subscriber has a set of directory numbers and each call is associated with at least one directory number, and for a call to the mobile subscriber, the circuitry coupled to the set of interfaces, upon detecting that the mobile subscriber is located outside the mobile subscriber's home region, routes the call depending on instructions in a subscriber service profile, the instructions being associated with the directory number that is associated with the call.

3. The communications system of claim 2, wherein, for a call to a mobile subscriber, the circuitry coupled to the set of interfaces determines the region in which the mobile subscriber is located and routes the call through a path including the interface that serves the mobile subscriber's home region and the interface that serves the region in which the mobile subscriber is located.

4. The communications system of claim 2, wherein, depending on the instructions in the subscriber service profile, the call is routed to one of (a) the subscriber, (b) another subscriber, and (c) a voice mail box.

5. The communications system of claim 2, wherein, for a call from a mobile subscriber, the circuitry coupled to the set of interfaces routes the call through a path including the interface in the region in which the mobile subscriber is located and the interface in the mobile subscriber's home region.

6. The communications system of claim 2, wherein the mobile subscriber has a transceiver with circuitry that transmits information regarding the mobile subscriber's home region to the circuitry coupled to the set of interfaces.

7. The communications system of claim 2, wherein the circuitry coupled to the set of interfaces comprises computer systems located in different areas, a computer system located in each respective area routing calls between the interfaces in the respective area.

8. The communications system of claim 2, wherein the circuitry coupled to the set of interfaces comprises multiple computer systems, each computer system coupled to sets of bearer and control channels and each computer system coupled to the other computer systems by a common control bus.

9. The communications system of claim 8, wherein the common control bus comprises a physically localized local area network.

10. The communications system of claim 8, wherein the common control bus comprises a physically distributed internet.

11. The communications system of claim 7, wherein the computer systems located in each respective area are coupled to multiple others of the computer systems located in the respective other areas.

12. The communications system of claim 2, wherein the circuitry that routes the call routes the call through a path including the PSTN between the mobile subscriber and the interface device that serves the subscriber's home region.

13. The communications system of claim 2, wherein the interface devices include roaming gateways coupled to the PSTN and coupled via a control bus to the circuitry that routes the call.

14. The communications system of claim 13, wherein the control bus comprises a physically localized local area network.

15. The communications system of claim 13, wherein the control bus comprises a physically distributed internet.

16. The communications system of claim 13, wherein the circuitry that routes the call routes the call through a path including the PSTN assigns routing numbers to each interface device from among a pool of reserved PSTN numbers and releases the routing numbers upon call completion.

17. A communications system comprising:

a set of interface devices adapted to be coupled to a PSTN, the interface devices configured to service various geographic regions;

coupled to each interface device, a set of devices for communicating with radio transceivers, each device for communicating with radio transceivers coupled to one or more radio transceivers; and circuitry coupled to the set of interface devices that, with respect to calls from the PSTN to mobile subscribers, provides a virtual proxy for the set of devices for communicating with the radio transceivers, and wherein, if a call from the PSTN through an interface device is directed to a subscriber in an area not serviced by the set of devices for communicating with the radio transceivers coupled to the interface, routes the call through a path including the PSTN to an interface device coupled to a set of devices for communicating that service in an area in which the subscriber is located;

wherein the portion of the path through the PSTN between the subscriber and the interface device in the mobile subscriber's home region is obtained based on a routing number assigned to the interface that serves the region in which the subscriber is currently located.

18. The communications system of claim 17, the circuitry coupled to the set of interface devices routing the call without interrogating a centralized database.

19. The communications system of claim 17, the circuitry coupled to the set of interface devices routing the cal without interrogating a home location register (HLR) and without interrogating a visited location register (VLR).

20. The communications system of claim 17, wherein the set of devices for communicating with the radio transceivers comprise radio port controllers (RPCs).

21. A communications system comprising:

a set of interface devices adapted to be coupled to a PSTN, the interface devices configured to service various geographic regions;

coupled to each interface device, a set of devices for communicating with radio transceivers, each device for communicating with radio transceivers coupled to one or more radio transceivers; and circuitry coupled to the set of interface devices that, with respect to calls from subscribers to the PSTN, has the same type of interface as a port on the PSTN, and wherein, if a call from a subscriber located outside the subscriber's home area is directed to the PSTN, the circuitry coupled to the set of interface devices routes the call to an interface device that services the subscriber's home area.

22. The communications system of claim 21, the circuitry coupled to the set of interface devices routing the call without interrogating a centralized database.

23. The communications system of claim 21, the circuitry coupled to the set of interface devices routing the call without interrogating a home location register (HLR) and without interrogating a visited location register (VLR).

24. The communications system of claim 21, wherein the port on the PSTN comprises a port of a class 5 switch.

25. A method of modifying an existing telephone network, the method comprising:

locating interface devices in various geographic regions of the telephone network within a national area;

coupling the interface devices to the telephone network in the various geographic regions in the national area, the interface devices coupled to circuitry coupled to radio transceivers that service mobile subscribers that may be located in ones of the various geographic regions, the mobile subscribers each being assigned to a respective geographic region;

wherein the interface devices are coupled to circuitry that, when a subscriber is located in a region in the national area other than in a geographic region to which the subscriber is assigned, routes a call with the mobile subscriber through a path including a radio transceiver in the region in which the mobile subscriber is currently located and an interface device in the region to which the subscriber is assigned; and, wherein, for calls with the subscriber located in a region other than the geographic region to which the subscriber is assigned, billing information is passed to the existing network regarding location of the subscriber only through the interface in the region to which the subscriber is assigned.

26. A communications system comprising:

a set of interface devices adapted to be coupled to a PSTN, the interface devices configured to serve various geographic regions;

radio transceivers coupled to interface devices in the set of interface devices, the radio transceivers for communication with mobile subscribers, the mobile subscribers each having a home region; and circuitry coupled to the set of interface devices that, for a call involving the PSTN and a mobile subscriber located outside the mobile subscriber's home region, routes the call through a path including an interface device that serves the mobile subscriber's home region;

wherein the circuitry coupled to the set of interfaces comprises multiple computer systems, each computer system coupled to sets of bearer and control channels and each computer system coupled to the other computer system by a common control bus.

27. A communications system comprising:

a set of interface devices adapted to be coupled to a PSTN, the interface devices configured to serve various geographic regions;

radio transceivers coupled to interface devices in the set of interface devices, the radio transceivers for communication with mobile subscribers, the mobile subscribers each having a home region; and circuitry coupled to the set of interface devices that, for a call involving the PSTN and a mobile subscriber located outside the mobile subscriber's home region, routes the call through a path including an interface device that serves the mobile subscriber's home region;

wherein the interface devices include roaming gateways coupled to the PSTN and coupled via a control bus to the circuitry that routes the call.

* * * * *